United States Patent
Devarakonda et al.

(10) Patent No.: US 9,509,183 B2
(45) Date of Patent: Nov. 29, 2016

(54) ROTOR WITH NON-CYLINDRICAL SURFACE FOR DYNAMOELECTRIC MACHINE

(71) Applicant: General Electric Company, Schenectady, NY (US)

(72) Inventors: Venkata Subramanya Sarma Devarakonda, Bangalore (IN); Patrick Robert Davis, Glenville, NY (US); James Jonathan Grant, Niskayuna, NY (US); Paul August Quail, Ballston Lake, NY (US); John Russell Yagielski, Scotia, NY (US)

(73) Assignee: General Electric Company, Schenectady, NY (US)

( * ) Notice: Subject to any disclaimer, the term of this patent is extended or adjusted under 35 U.S.C. 154(b) by 499 days.

(21) Appl. No.: 13/946,698

(22) Filed: Jul. 19, 2013

(65) Prior Publication Data

US 2015/0022036 A1 Jan. 22, 2015

(51) Int. Cl.
*H02K 19/00* (2006.01)
*H02K 19/02* (2006.01)
(Continued)

(52) U.S. Cl.
CPC .............. *H02K 1/265* (2013.01); *H02K 1/246* (2013.01); *H02K 3/12* (2013.01); *H02K 9/00* (2013.01); *H02K 19/00* (2013.01); *H02K 29/03* (2013.01); *H02K 2201/03* (2013.01); *H02K 2213/03* (2013.01)

(58) Field of Classification Search
CPC ...... H02K 19/00; H02K 19/02; H02K 19/16; H02K 19/26; H02K 19/04

USPC ......................................... 310/263, 269, 264
IPC ............ H02K 19/00,19/02, 19/16, 19/26, 19/04
See application file for complete search history.

(56) References Cited

U.S. PATENT DOCUMENTS 3,512,074 A * 5/1970 Soper ........................ H02J 3/18
                                                          310/184
3,681,628 A * 8/1972 Krastchew ............. H02K 9/005
                                                           310/52
(Continued)

FOREIGN PATENT DOCUMENTS

| CN | 101090226 A | * | 12/2007 |
| JP | 3303674 B2 | * | 7/2002 |
| JP | 2014209828 A | * | 6/2013 |

OTHER PUBLICATIONS

Machine translation of CN 101090226 A retrieved from EPO.*
(Continued)

*Primary Examiner* — Quyen Leung
*Assistant Examiner* — Minki Chang
(74) *Attorney, Agent, or Firm* — Ernest G. Cusick; Hoffman Warnick, LLC

(57) ABSTRACT

Various embodiments include apparatuses adapted to include a dynamoelectric machine rotor with a modified outer surface. In some embodiments apparatuses include a dynamoelectric machine rotor including a rotor body having a spindle, pole regions, the pole regions having a non-uniform radial distance from an axis of rotation of the rotor to an outer surface of the pole regions and a plurality of slots in the outer surface of the rotor body, the plurality of slots being spaced apart in a circumferential direction of the rotor body, each of the plurality of slots extending in an axial direction of the rotor body.

20 Claims, 6 Drawing Sheets

(51) Int. Cl.
*H02K 3/12* (2006.01)
*H02K 1/26* (2006.01)
*H02K 9/00* (2006.01)
*H02K 1/24* (2006.01)
*H02K 29/03* (2006.01)

(56) References Cited

U.S. PATENT DOCUMENTS

| | | | |
|---|---|---|---|
| 4,363,986 A | 12/1982 | Joho et al. | |
| 4,743,825 A * | 5/1988 | Nashiki | H02K 29/06 318/722 |
| 4,900,964 A | 2/1990 | Ying et al. | |
| 5,001,378 A | 3/1991 | Miller et al. | |
| 5,203,070 A * | 4/1993 | Montgomery | H02K 15/00 29/596 |
| 5,736,803 A | 4/1998 | Masson | |
| 5,980,218 A * | 11/1999 | Takahashi | F04D 29/058 417/243 |
| 7,518,332 B2 * | 4/2009 | Nakazawa | H02K 21/14 310/162 |
| 7,888,837 B2 | 2/2011 | Lindh et al. | |
| 7,893,575 B2 | 2/2011 | Fujita et al. | |
| 2006/0181171 A1 * | 8/2006 | Zhao | H02K 7/00 310/154.22 |
| 2011/0025160 A1 * | 2/2011 | Stancu | H02K 3/48 310/180 |
| 2014/0035422 A1 * | 2/2014 | Mikami | H02K 1/2713 310/156.71 |

OTHER PUBLICATIONS

Machine translation of CN 101090226 A.*
Machine translation of JP 3303674 B2.*

* cited by examiner

ROTOR WITH NON-CYLINDRICAL SURFACE FOR DYNAMOELECTRIC MACHINE

FIELD OF THE INVENTION

The subject matter disclosed herein relates generally to dynamoelectric machine rotors. More specifically, the disclosure provided herein relates to dynamoelectric machine with rotors having modified magnetic air gaps.

BACKGROUND OF THE INVENTION

Short circuit ratio (SCR) in synchronous dynamoelectric machines is a measure of generator stability or how much the magnetic field in the generator is changed by changes in the load. Higher SCR will improve steady-state stability characteristics of a dynamoelectric machine or a generator. Higher SCR has traditionally been met by the designer either by creating larger machines or by incorporating pole face slots, both of these options have a higher cost associated with them.

Conventional rotors for dynamoelectric machines are generally cylindrically shaped with uniform radial distance between their outer surfaces and the inner surface of their associated stators.

BRIEF DESCRIPTION OF THE INVENTION

Various embodiments include apparatuses adapted to include a dynamoelectric machine rotor with a modified outer surface and a modified magnetic air gap. In some embodiments apparatuses include a dynamoelectric machine rotor including a rotor body having a spindle, pole regions, the pole regions having a non-uniform radial distance from an axis of rotation of the rotor to an outer surface of the pole regions and a plurality of slots in the outer surface of the rotor body, the plurality of slots being spaced apart in a circumferential direction of the rotor body, each of the plurality of slots extending in an axial direction of the rotor body.

A first aspect provides a dynamoelectric machine rotor comprising: a rotor body having a spindle; pole regions, the pole regions having a non-uniform radial distance from an axis of rotation of the rotor to an outer surface of the pole regions; and a plurality of slots in the outer surface of the rotor body, the plurality of slots being spaced apart in a circumferential direction of the rotor body, each of the plurality of slots extending in an axial direction of the rotor body.

A second aspect provides a dynamoelectric machine comprising: a stator; a rotor positioned within the stator, the rotor including: a rotor body having a spindle; pole regions having a non-uniform radial distance from an axis of rotation of the rotor to an outer surface of the pole regions; and a plurality of slots in an outer surface of the rotor body, the plurality of slots being spaced apart in a circumferential direction of the rotor body, the plurality of slots extending in an axial direction of the rotor body.

A third aspect provides a dynamoelectric machine comprising: a stator; and a rotor positioned within the stator, the rotor having an oblate cylindrical cross-section including, a first radius orthogonal to a second radius, the first radius and the second radius having different lengths, the rotor including a rotor body having: a spindle; pole regions having a non-uniform radial distance from an axis of rotation of the rotor to an outer surface of the pole regions; and a plurality of slots in an outer surface of the rotor body, the plurality of slots being spaced apart in a circumferential direction of the rotor body, the plurality of slots extending in an axial direction of the rotor body.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
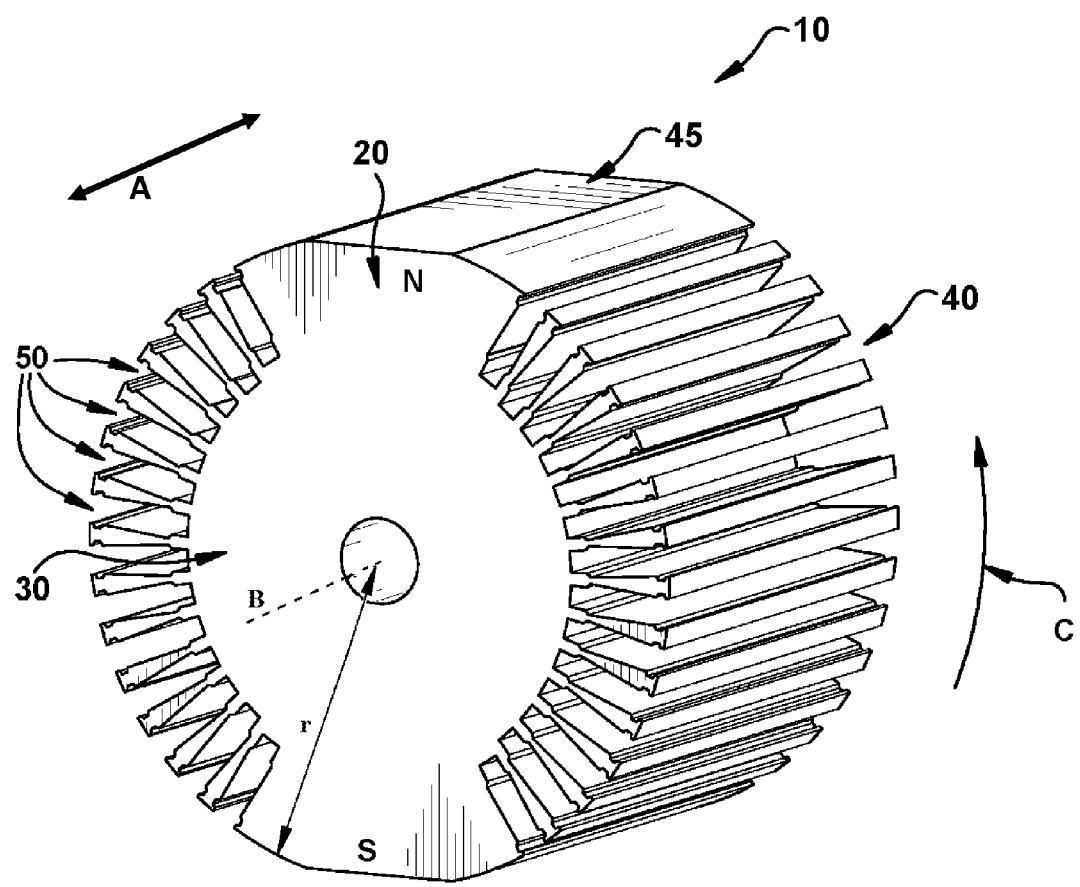
FIG. 1 illustrates a three-dimensional perspective view of a rotor according to embodiments of the invention.

It is noted that the drawings of the invention are not necessarily to scale. The drawings are intended to depict only typical aspects of the invention, and therefore should not be considered as limiting the scope of the invention. It is understood that elements similarly numbered between the figures may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein.

DETAILED DESCRIPTION OF THE INVENTION

The subject matter disclosed herein relates generally to dynamoelectric machine rotors. More specifically, the disclosure provided herein relates to dynamoelectric machine with rotors having modified magnetic air gaps.

Short circuit ratio (SCR) is an important design parameter of a dynamoelectric machine or a generator. SCR is a measure of the generator stability or how much the magnetic field in the generator is changed by changes in the load. Higher SCR will improve steady-state stability characteristics but may require a larger generator.

As indicated herein, higher SCR has traditionally been met by the designer either by creating a larger dynamoelectric machine or by incorporating pole face slots, with both of these options having an associated cost. Many conventional dynamoelectric machines have an SCR in the range of 0.35 to 0.58. In contrast, dynamoelectric machines according to various embodiments of the invention can realize an enhanced SCR typically from 6 to 10 percent, when compared with these conventional dynamoelectric machines which have a rotor referred to herein as a "baseline rotor".

Aspects of the invention provide for enhanced dynamoelectric machine short circuit ratio while avoiding cost increases associated with larger machines.

As further differentiated from conventional dynamoelectric machines, embodiments described herein help in reducing the costs of achieving higher SCR without compromising on any of the design parameters by modifying the rotor surface. Various embodiments described herein allow for increased short circuit ratio by modifying the conventional uniform magnetic air gap between the stator and the rotor. Modification of the magnetic air gap according to aspects refers to creation of non-uniform radial distance between stator and rotor. These novel designs with modified magnetic air gaps improve the SCR without altering the overall dimensions of the generator or dynamoelectric machine. Modification of the magnetic air gap may be accomplished by modifying the conventional cylindrical outer surface of a rotor by various methods. Yet another characteristic according to various aspects is to enhance the SCR to a required value by profiling, chopping or grooving the rotor to a required extent. Such modification provides flexibility in the design and can be optimized based on the performance, efficiency and cost requirements. Various aspects as described are not limited to a 2-pole cylindrical rotor dynamoelectric machines and thus can be extended to machines with 4-poles.

Various embodiments include outer rotor surfaces that may be described as a single flat surface, multiple flat surfaces, concave, convex, elliptical or multi-grooved. Furthermore the shape of the rotor body may be elliptical or oval, thus producing non-uniform radial distance between the inner stator surface and outer rotor surface.

During operation of the dynamoelectric machine according to aspects, a field current is applied to the excitation winding of the rotor to produce a rated voltage under an open circuit condition at the stator. One skilled in the art understands that a rated voltage is particular to a given machine. Rated voltages may typically be between about 9 kV to 26 kV, however such values should not be understood to be limiting.

Also during operation, a field current is applied to excitation winding of the rotor, which produces a rated current under a short circuit condition at the stator. The rated current is particular to a given machine and values of such a current may vary from machine to machine. SCR is the defined by a value of the field current applied to produce rated voltage under open circuit condition divided by a value of the field current to produce rated current under short circuit condition, in the armature winding present in the stator. According to aspects, the modified magnetic air gaps of various embodiments can achieve an enhanced value of SCR typically from 6 to 10 percent over the SCR of a baseline rotor, as discussed above.

As described, aspects may help in reducing the cost of achieving higher SCR without compromising other design parameters by modifying the magnetic air gap between the stator and the rotor.

Turning to FIG. 1, a perspective drawing illustrating a dynamoelectric machine rotor 10 according to embodiments is shown. Aspects may include rotor body 20 having a radius r from axis of rotation B. Rotor body 20 may include spindle 30. Spindle 30 defines a rotational axis about which the rotor body and spindle rotate. A plurality of slots 50 in an outer surface 40 of rotor body 20 is shown. Plurality of slots 50 may be spaced apart in a circumferential direction C of rotor body 20, each of the plurality of slots 50 extending in an axial direction A of rotor body 20. Plurality of slots 50 may be shaped to accept excitation windings 90, (excitation windings 90 shown in FIG. 6).

According to some aspects, rotor 10 may be a two-pole rotor, having poles N and S, as shown in FIG. 1. Some embodiments include pole regions S, N having a flat outer surface 45.

Figure 2:
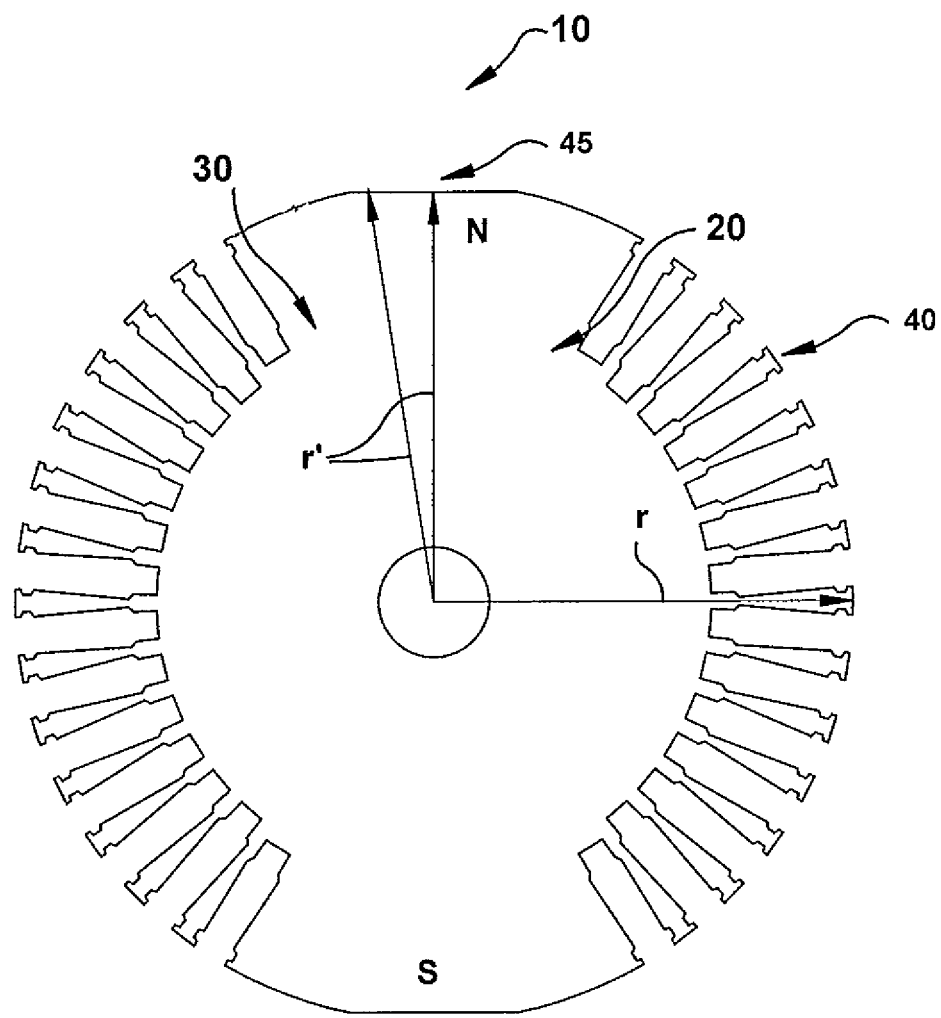
FIG. 2 illustrates a cross-sectional view of a rotor according to embodiments of the invention.

FIG. 2 illustrates a cross sectional view of rotor body 20. Rotor body 20 may include pole regions S, N having a non-uniform radial distance r' from axis B of rotation of rotor 10 to pole regions' outer surface 40.

Figure 3:
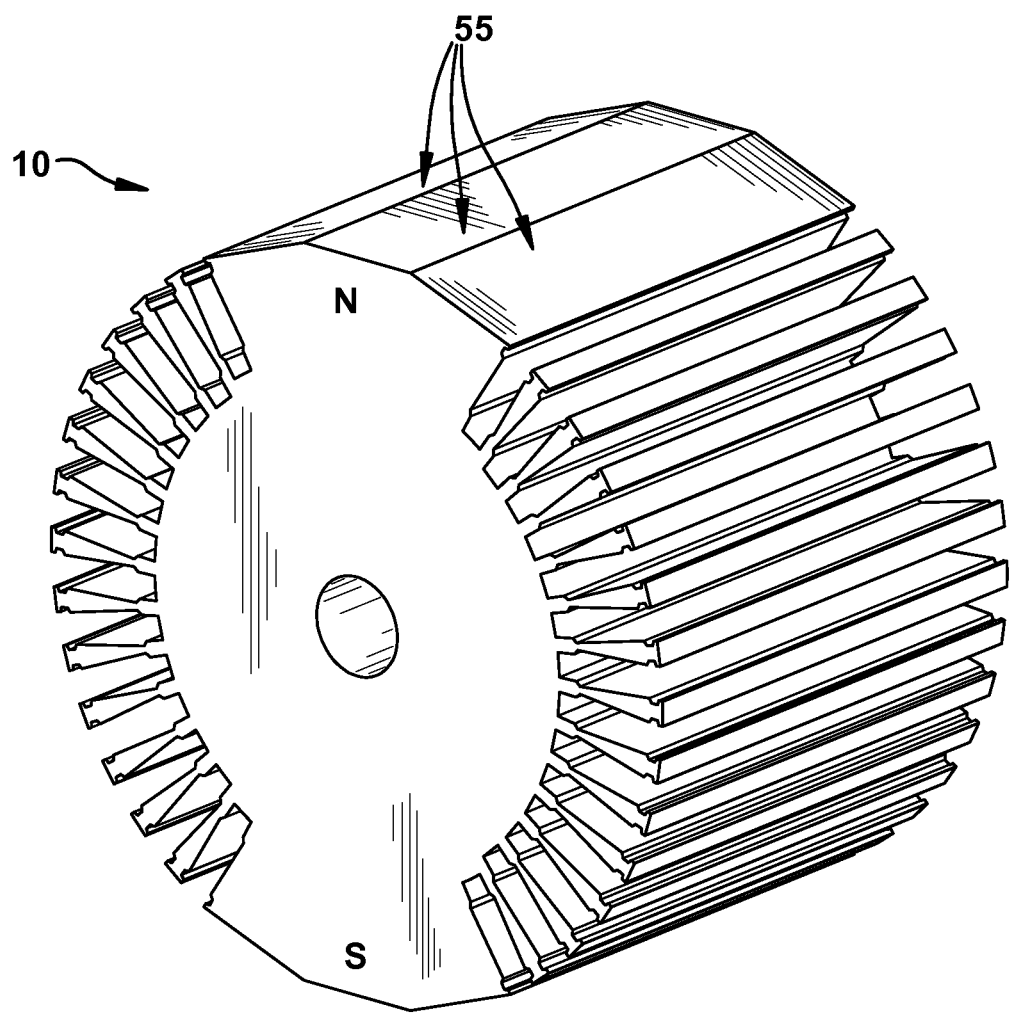
FIGS. 3-4 illustrate three-dimensional perspective views of rotors according to embodiments of the invention.

FIG. 3 is a perspective drawing illustrating a dynamoelectric machine rotor 10 according to embodiments of the invention. FIG. 3 illustrates an embodiment according to aspects where pole regions S, N each include a plurality of flat outer surfaces 55. While FIG. 3 illustrates two pole regions S, N, it should be understood that more than two pole regions are within the scope of different aspects.

Figure 4:
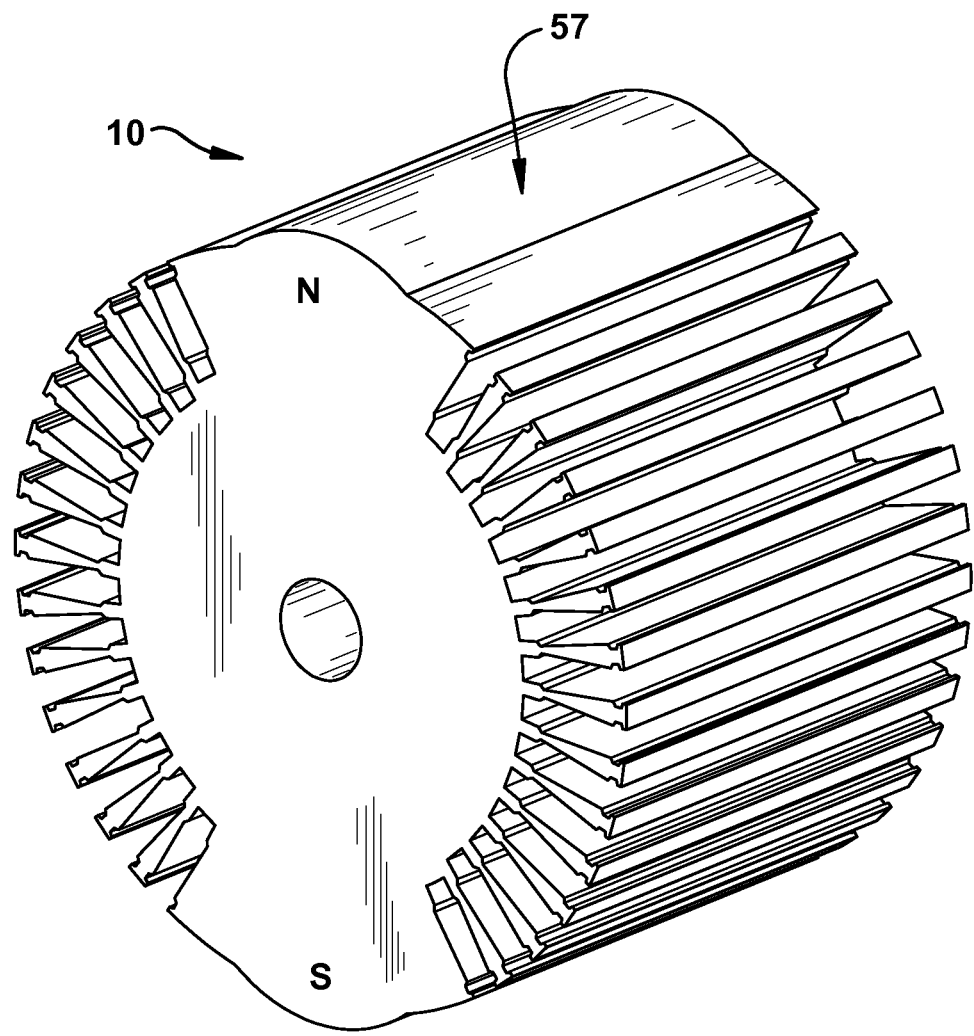

FIG. 4 is a perspective drawing illustrating a dynamoelectric machine rotor 10 according to embodiments of the invention. FIG. 4 illustrates an embodiment according to aspects where pole regions S, N each include convex outer surfaces 57. Only one example of a convex shape is illustrated, however other aspects may include different convex shapes.

Figure 5:
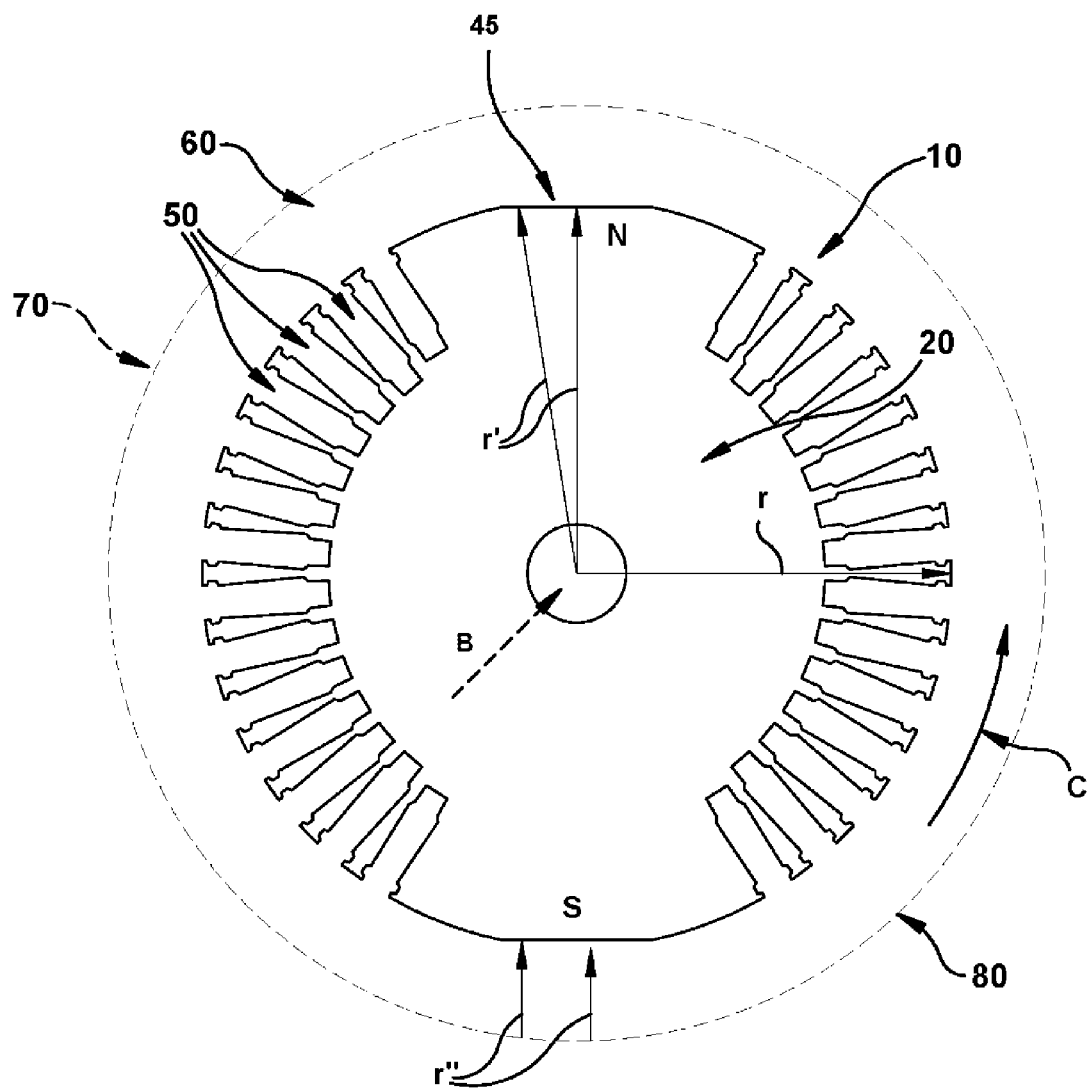
FIG. 5 illustrates a cross-sectional view of an apparatus according to embodiments of the invention.

FIG. 5 is a cross-sectional drawing illustrating parts of a dynamoelectric machine 60 according to embodiments. Dynamoelectric machine 60 may be a synchronous generator and/or may be gas cooled, liquid cooled, or a combination of both, additionally the dynamoelectric machine 60 may be cooled by any method or technology now known or later developed. Dynamoelectric machine 60 may be a multiphase generator, for example a three-phase generator; however a three-phase generator is not illustrated in the drawings. Dynamoelectric machine 60 includes stator 70 and rotor 10 positioned within stator 70. Pole regions S, N are illustrated having non-uniform radial distance r' from axis of rotation A of rotor 10 to outer surface 45 of pole regions S, N. According to aspects, plurality of slots 50 in outer surface 40 of the rotor body 20, the plurality of slots being spaced apart in circumferential direction C of rotor body 20, with plurality of slots 50 extending in axial direction A of rotor body 20, as illustrated. FIG. 5 illustrates non-uniform radial distance r″ between stator 70 and outer surface 45 of pole regions S, N. It should be noted that different configurations of rotor 10 according to various aspects described herein above may be used in conjunction with dynamoelectric machine 60, and the descriptions of such embodiments are not repeated here for the sake of brevity. FIG. 5 shows inner surface 80 of stator 70 is cylindrical and has a circular cross section.

Figure 6:
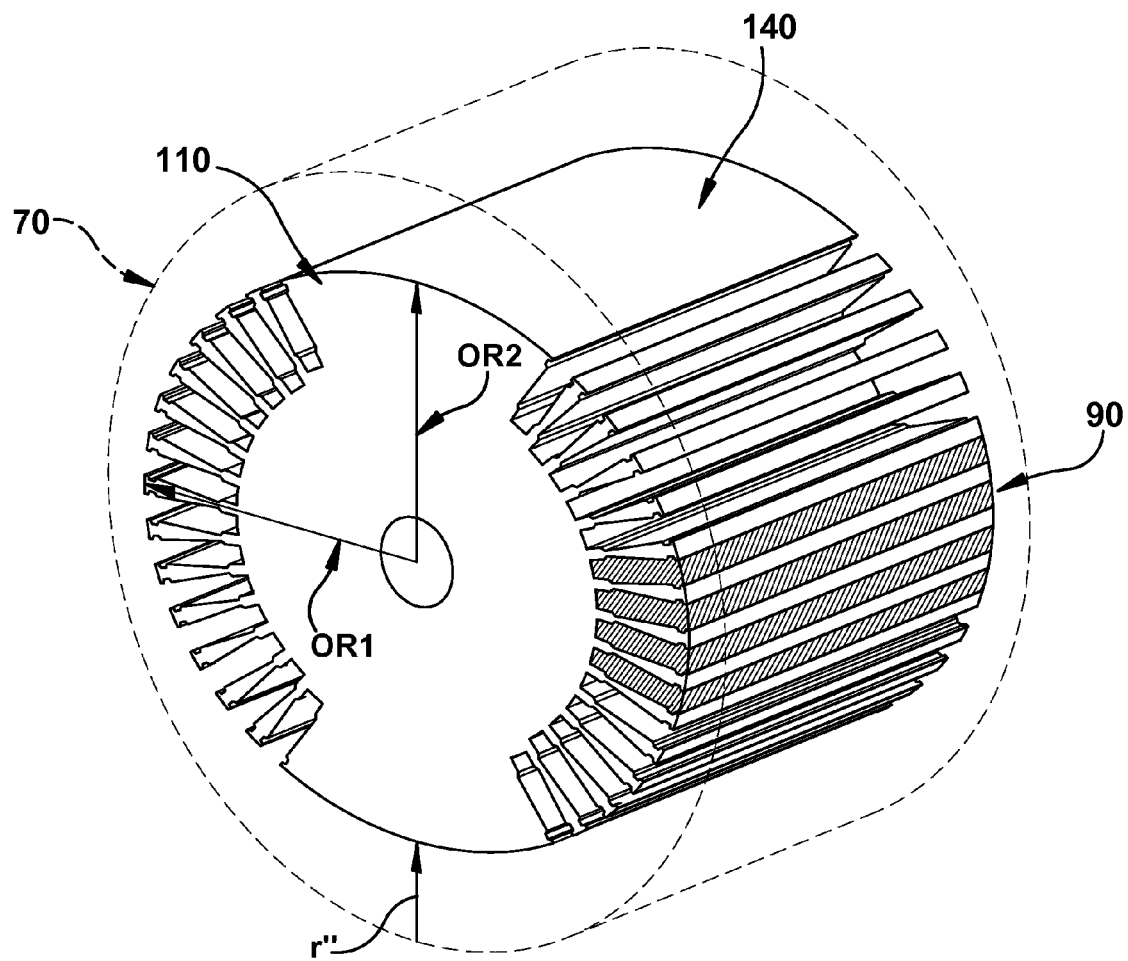
FIG. 6 illustrates a cross-sectional view of a rotor according to embodiments of the invention.

FIG. 6 is a perspective drawing illustrating a dynamoelectric machine rotor 110 according to embodiments of the invention. Rotor 110 has an oblate cylindrical cross-section including a first radius OR1 orthogonal to second radius OR2. First radius OR1 and second radius OR2 have different lengths, as illustrated. As above, stator 70 has a circular cross section, and as above, but not illustrated in FIG. 6, there is a non-uniform radial distance between stator 70 and outer surface 140 of pole regions S, N of rotor 110.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the terms "axial" and/or "axially" refer to the relative position/direction of objects along axial direction A, which is substantially parallel with the rotational axis B of a rotor. As further used herein, the terms "radial" and/or "radially" refer to the relative position/direction of objects along radius (r), which is substantially perpendicular with axial direction A and intersects axis B at only one location. Additionally, the terms "circumferential" and/or "circumferentially" refer to the relative position/direction of objects along a circumference which surrounds axis B but does not intersect the axis B at any location.

The term "enhances" used in reference to rotors according to embodiments of the invention, herein, refers to a increase in the SCR above a nominal amount, for example in particular embodiments enhances refers to an increase of approximately 6 to 10 percent of the SCR as compared to the SCR of a baseline dynamoelectric machine rotor; the baseline dynamoelectric machine rotor having the same dimensions and materials as the dynamoelectric machine rotor, and having pole regions with a uniform radial distance from an axis of rotation of the baseline rotor to an outer surface of the pole regions of the baseline rotor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A dynamoelectric machine rotor comprising:
   a rotor body including:
      a spindle;
      pole regions, each pole region having a non-uniform radial distance from an axis of rotation of the rotor to an outer surface of the pole regions, wherein the pole regions each include a single flat radially-facing outer surface; and
      a plurality of slots in the outer surface of the rotor body, the plurality of slots being spaced apart in a circumferential direction of the rotor body, each of the plurality of slots extending in an axial direction of the rotor body.

2. The rotor of claim 1, wherein the rotor is a two-pole rotor.

3. The rotor of claim 1, wherein, when in use within the dynamoelectric machine, a radial distance between an inner stator surface of the dynamoelectric machine and the outer surface of the pole regions is non-uniform.

4. The rotor of claim 1, wherein the pole regions each include a plurality of adjacent flat outer surfaces.

5. The rotor of claim 1, wherein the pole regions each include a convex outer surface.

6. The rotor of claim 1, wherein the plurality of slots are shaped to accept excitation windings.

7. The rotor of claim 1, wherein the single flat radially-facing outer surface is located at each pole region, between a first circumferential end and a second circumferential end thereof.

8. A dynamoelectric machine comprising:
   a stator;
   a rotor positioned within the stator, the rotor including a rotor body having:
      a spindle;
      pole regions having a non-uniform radial distance from an axis of rotation of the rotor to an outer surface of the pole regions, wherein the pole regions each include a single flat radially-facing outer surface; and
      a plurality of slots in an outer surface of the rotor body, the plurality of slots being spaced apart in a circumferential direction of the rotor body, the plurality of slots extending in an axial direction of the rotor body.

9. The dynamoelectric machine of claim 8, wherein the rotor is a two-pole rotor.

10. The dynamoelectric machine of claim 8, wherein a radial distance between the inner stator surface and the outer surface of the pole regions is non-uniform.

11. The dynamoelectric machine of claim 8, wherein the pole regions each include a single flat surface.

12. The dynamoelectric machine of claim 8, wherein the pole regions each include an outer convex surface.

13. The dynamoelectric machine of claim 8, wherein the plurality of slots are shaped to accept excitation windings.

14. The dynamoelectric machine of claim 13, further comprising excitation windings,
   wherein during operation of the dynamoelectric machine, a field current is applied to the excitation windings, producing a rated voltage under an open circuit condition at the stator;
   wherein a field current is applied to the excitation windings, producing a rated current under a short circuit condition at the stator; and
   wherein the dynamoelectric machine has a short circuit ratio defined by a value of the field current applied to produce rated voltage under open circuit condition divided by a value of the field current to produce rated current under short circuit condition;
   wherein the non-uniform radial distance increases the short circuit ratio in the dynamoelectric machine.

15. The dynamoelectric machine of claim 8, wherein an inner surface of the stator is cylindrical and has a circular cross section.

16. The dynamoelectric machine of claim 8, wherein the single flat radially-facing outer surface is located at each pole region, between a first circumferential end and a second circumferential end thereof.

17. A dynamoelectric machine comprising:
   a stator; and
   a rotor positioned within the stator, the rotor having an oblate cylindrical cross-section including, a first curve having a first radius and a second curve having a second radius, the first radius being orthogonal to the second radius, the first radius and the second radius having different lengths, the rotor including a rotor body having:
      a spindle;
      pole regions having a non-uniform radial distance from an axis of rotation of the rotor to an outer surface of the pole regions, wherein the pole regions each include a single flat radially-facing outer surface; and
      a plurality of slots in an outer surface of the rotor body, the plurality of slots being spaced apart in a circumferential direction of the rotor body, the plurality of slots extending in an axial direction of the rotor body, and the plurality of slots being shaped to accept excitation windings.

18. The dynamoelectric machine of claim 17, wherein an inner surface of the stator is cylindrical and has a circular cross section.

19. The dynamoelectric machine of claim 17, further comprising excitation windings within the slots, wherein during operation of the dynamoelectric machine, a field current is applied to the excitation windings, producing a rated voltage under an open circuit condition at the stator;

wherein a field current is applied to the excitation windings, producing a rated current under a short circuit condition at the stator; and wherein the dynamoelectric machine has a short circuit ratio defined by a value of the field current applied to produce rated voltage under open circuit condition divided by a value of the field current to produce rated current under short circuit condition;

wherein the non-uniform radial distance increases the short circuit ratio in the dynamoelectric machine.

20. The dynamoelectric machine of claim 17, wherein the single flat radially-facing outer surface is located at a circumferential midpoint of each of the pole regions.

* * * * *